United States Patent [19]
Gensike et al.

[11] 4,188,114
[45] Feb. 12, 1980

[54] MICROFICHE SCANNER MODULE

[75] Inventors: Karl H. Gensike, Northridge; Ronald Sam, Los Angeles, both of Calif.

[73] Assignee: Photomatrix Corporation, Santa Monica, Calif.

[21] Appl. No.: 916,946

[22] Filed: Jun. 19, 1978

[51] Int. Cl.² ........................................... G03B 27/44
[52] U.S. Cl. ...................................... 355/54; 355/45
[58] Field of Search .................. 355/5, 53, 54, 44, 45

[56] References Cited
U.S. PATENT DOCUMENTS

| | | | |
|---|---|---|---|
| 3,094,036 | 6/1963 | Benson | 355/45 X |
| 3,765,759 | 10/1973 | Yamada | 355/45 |
| 3,784,303 | 1/1974 | Sullivan, Jr. et al. | 355/54 X |
| 3,988,064 | 10/1976 | Sone et al. | 355/45 X |
| 4,123,157 | 10/1978 | Klose et al. | 355/54 X |

*Primary Examiner*—Richard A. Wintercorn
*Attorney, Agent, or Firm*—Ralph B. Pastoriza

[57] ABSTRACT

The microfiche scanner module constitutes a specially designed modular unit capable of being substituted for a normal microfilm cartridge mechanism in a reader/printer projector to thereby enable the printing and displaying of data information stored on microfiche without requiring any major alterations in the reader/printer projector. The scanner unit includes a frame supporting a carriage for movement in a fore and aft direction, the carriage in turn supporting a film platen for movement in a left and right direction. A microfiche is positioned on the film platen between the normally provided light source and projection lens in the reader/printer projector. Movement of the carriage in a forward direction will scan one column of the microfiche after which the carriage is retracted and shifted to the right so that a second column can be scanned, the process being repeated until all of the information on the microfiche is printed in the printer. The movement of the carriage in a forward direction in the printing process of each column is controlled by the print paper moving mechanism in the projector so that proper image positioning for printing is assured.

3 Claims, 6 Drawing Figures

MICROFICHE SCANNER MODULE

This invention relates generally to reader/printer projectors and more particularly to a microfiche scanner module for use in such projectors to provide readouts of data on a microfiche from the projector without having to effect any major alterations in the projector.

BACKGROUND OF THE INVENTION

Continuous reader/printer projectors are well known in the art for reproducing on print paper microfilm information normally stored on 16-mm. roll film. These reader/printer projectors normally include a casing having a projection screen and including appropriate print paper moving components. Appropriate mirrors and a projection lens are incorporated in the display screen casing. Positioned in spaced relationship below the casing is normally provided a control housing incorporating an appropriate light source. A 16-mm. film cartridge containing the microfilm is positionable between the display casing and control housing so that the light source will be directed up through successive images of the film to the projection lens and by way of the mirrors to the print paper and also to the display screen. In these systems, the 16-mm. roll microfilm in a cartridge is driven by the print paper moving motor at an appropriate proportional rate so that continuous printing is effected without any blurred images. The paper print-out is magnified, for example, 24 times, during this process.

It has become increasingly desirable in certain situations to store data on microfiche as opposed to microfilm. A microfiche constitutes a rectangular film having a plurality of columns in side-by-side parallel relationship, each column in turn containing data. In some instances, there may be as many as 12 separate images in a column so that as much as 60 different images can be stored on a single microfiche where 5 columns are provided.

While specially designed readers and printers are known for reproducing information from microfiche, there are certain applications where it is desirable to provide a continuous print paper of certain data such as graphic information; for example, an oil well log, which information normally could not be accommodated in a single microfiche image in one column. Thus, continuing with the example of an oil well log, the data could be accommodated on a microfiche by utilizing an entire column for a portion of the log and then utilizing the next column as a continuation of the log, and so forth. However, to provide a continuous print-out of this information with normally provided microfiche printing equipment, a series of separate images up to 60 would have to be printed and then the various print papers connected together to provide the desired log.

Where the log information is stored on a continuous 16-mm. microfilm, there is no problem in providing a continuous print-out of the log and presently available reader/printer projectors for this purpose are well known. It would clearly be desirable, however, if the available known reader/printer projectors for microfilm could also be utilized to read out oil well log information stored on a microfiche.

BRIEF DESCRIPTION OF THE PRESENT INVENTION

With the foregoing considerations in mind, the present invention contemplates the provision of a microfiche scanner module designed to be substituted for the normal microfilm cartridge mechanism in presently available reader/printer projectors for enabling the display and the printing of data stored on microfiche.

Briefly, the module includes a supporting frame positionable in a reader/printer projector between the normally provided light source and projection lens. A carriage means is supported on the frame means for movement in a first direction and a platen means for receiving the microfiche is supported on the carriage means for movement in a second direction at right angles to the first direction, the platen supporting the microfiche with its columns aligned in the first direction.

With the foregoing arrangement, successive columns can be scanned by moving the carriage in the first direction, retracting the carriage, moving the film platen one column width in the second direction, and thence moving the carriage again in the first direction, and repeating these movements until all columns have been scanned.

The module includes a means for moving the carriage in the first direction arranged to be connected to the print paper moving means in the reader/printer projector at an appropriate proportional speed so that proper printing of the data from the microfiche column being scanned on the print paper is assured.

BRIEF DESCRIPTION OF THE DRAWINGS

A better understanding of this invention as well as futher features and advantages thereof, will be had by now referring to the accompanying drawings in which.

DETAILED DESCRIPTION OF THE PREFERRED EMBODIMENT

Figure 1:
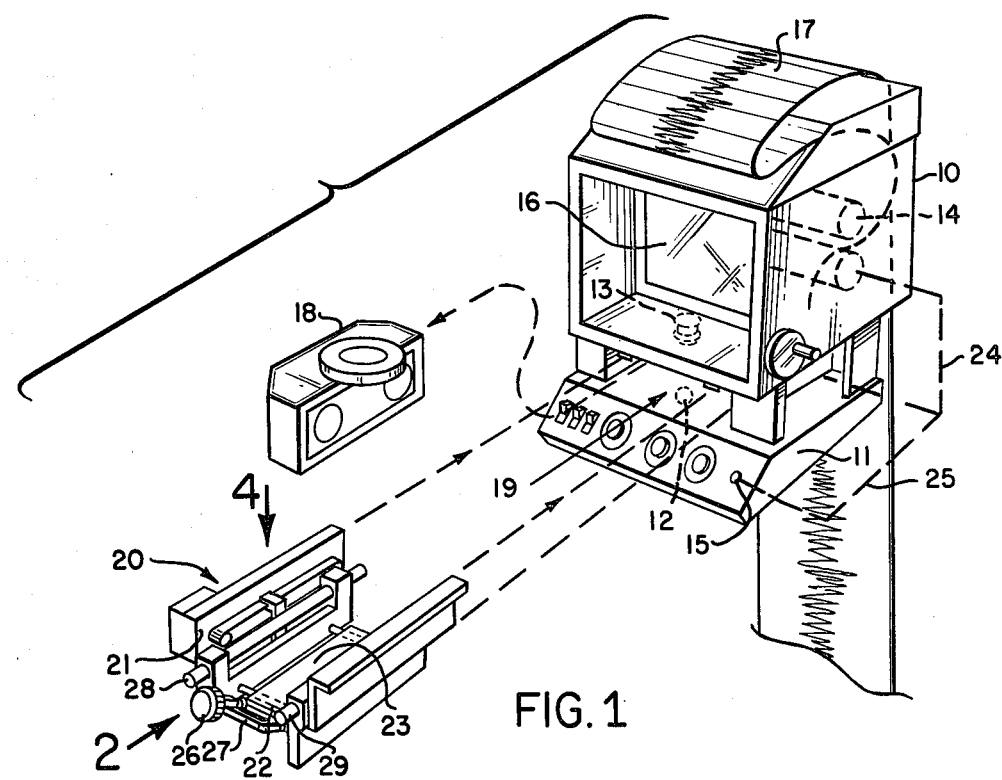
FIG. 1 is a perspective view of a reader/printer projector with the microfiche scanner module shown in exploded relationship.

Referring first to FIG. 1, there is shown a known type of reader/printer projector including an upper housing 10 and lower control housing 11. Control housing 11 incorporates a light source schematically indicated at 12 for projecting light upwardly through an appropriate projection lens, also indicated by phantom lines at 13 in the upper housing 10.

The upper housing 10 includes appropriate mirrors directing a magnified image on an appropriate film positioned between the light source 12 and lens 13 onto print paper. In FIG. 1, the print paper is moved by an appropriate print paper moving means schematically indicated in phantom lines at 14.

The lower control housing 11 includes a print paper cut button 15 which, when actuated, will cut off a length of the print paper. A display screen 16 is provided for displaying the images to be printed. The exposed print paper itself is automatically developed and feeds out from the top of the upper housing 10 as indicated at 17.

Shown exploded away from the reader/printer in FIG. 1 is a film cartridge mechanism 18 normally positioned between the upper housing 10 and lower control housing 11 indicated by the arrow 19. This film cartridge mechanism is arranged to receive microfilm cartridges, the microfilm in the cartridge being driven from the print paper moving means 14 in the reader/printer so that a continuous print-out of information on the microfilm is provided.

In accord with the present invention, the cartridge mechanism 18 is removed from between the upper housing 10 and control housing 11 as indicated by the dashed arrow and in place thereof there is provided the microfiche scanner module indicated generally by the numeral 20 of the present invention. This module, as will become clearer as the description proceeds, is positionable in the space 19 so that successive data images on a microfiche will be positionable between the light source 12 and projection lens 13 of the reader/printer so that this data can be provided on the same print-out paper normally used for microfilm.

Referring now specifically to the module 20 of FIG. 1, this structure includes a supporting frame 21 positionable in the opening 19 between the light source and projection lens as described. A carriage 22 in turn is mounted on the supporting frame for movement in a fore and aft direction as viewed in FIG. 1. A film platen 23 in turn, is mounted on the carriage for movement in a left and right direction, the film platen being dimensioned to hold a microfiche.

Referring to the reader/printer projector of FIG. 1, there is depicted schematically by means of the dash-dot lines 24 a connection between the print paper moving means 14 and an appropriate carriage moving means on the module 20 to be subsequently described. Also, there is depicted by the dash-dot line 25 a connection from the paper cut button 15 of the reader/printer projector to the means for moving the carriage in the module also to be subsequently described.

Referring once again to the module 20, there is further shown in FIG. 1 a manual means in the form of a knob 26 for moving the platen 23 in the referred to left and right directions and a handle structure 27 constituting part of the carriage 22 for enabling manual retraction of this carriage after it has been moved forwardly by the connection to the print paper moving means indicated by the dash-dot coupling 24.

Figure 2:
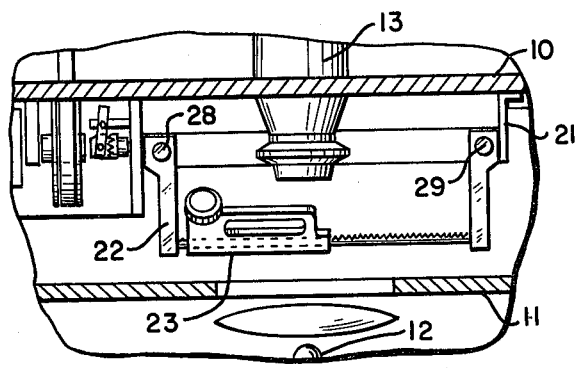
FIG. 2 is a fragmentary view partly in cross section showing the module in position in the projector of FIG. 1.

Referring now to the view of FIG. 2, the positioning of the frame 21 between the upper housing 10 and lower housing 11 of the projector is illustrated wherein it will be noted that the light source schematically depicted at 12 will direct light upwardly through the frame structure, carriage 22 and film platen 23 to the projection lens 13. Also shown in both FIGS. 1 and 2 are first and second guide rails 28 and 29 for guiding movement of the carriage in the fore and aft directions.

Figure 3:
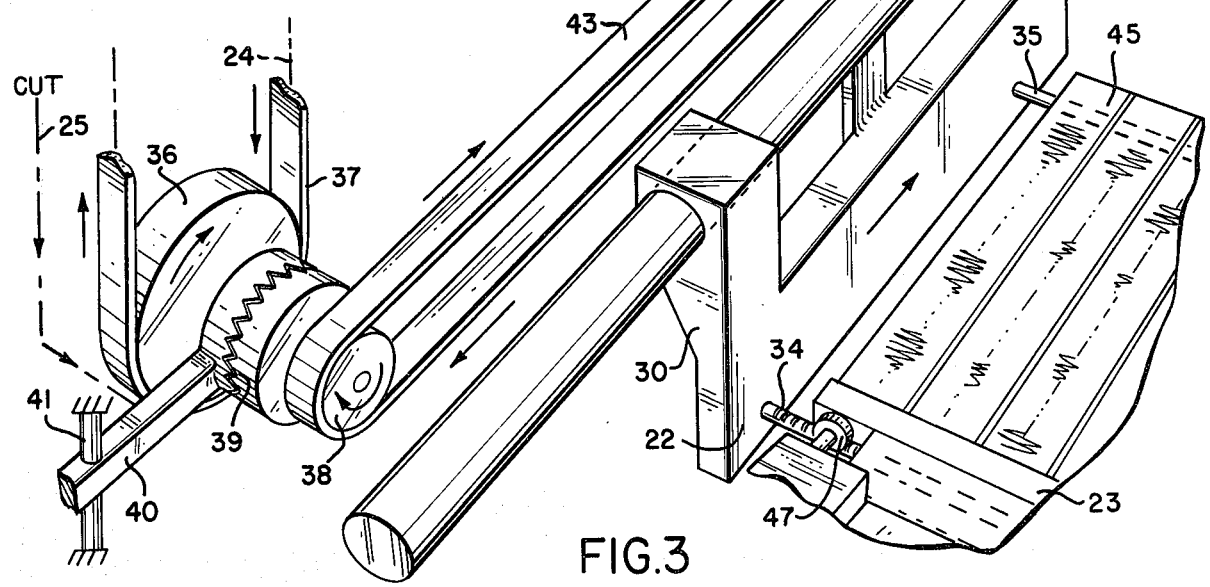
FIG. 3 is a greatly enlarged fragmentary perspective view partly schematic in form showing certain components of the module.
Figure 4:
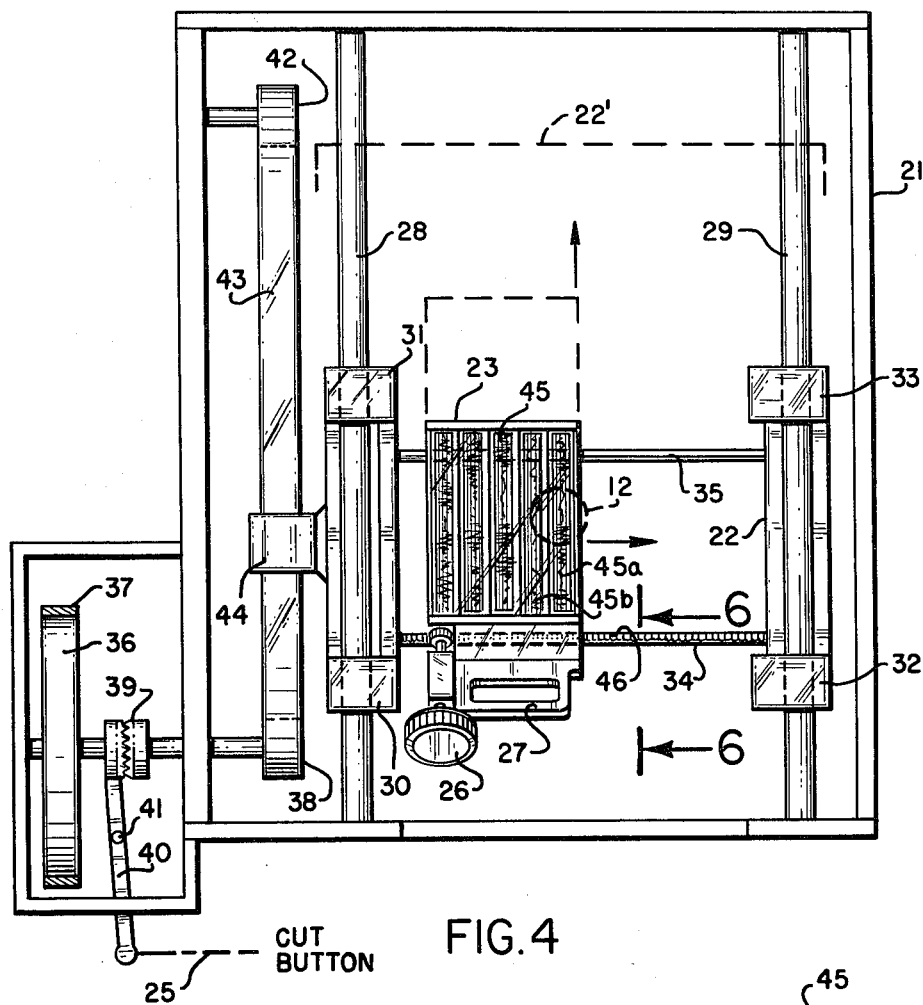
FIG. 4 is a top plan view of the module.

All of the foregoing will now become clearer by referring to FIGS. 3 and 4. As shown, in FIG. 3 the first guide rail 28 receives upwardly extending guide blocks 30 and 31 through which the guide rail passes. With reference to FIG. 4, the other guide rail 29 similarly receives upwardly extending guide blocks 32 and 33 on the other side of the carriage 22.

In a similar manner as best shown in FIG. 4, the film platen 23 is guided for movement in a left and right or transverse direction as by transverse guide rails 34 and 35 upon which the platen 23 rides.

Referring now to the lower left portions of both FIGS. 3 and 4, there is illustrated in greater detail the means for driving the carriage 22 in a forward direction. This means includes a first drive roller 36 connected by way of a belt 37 to the print paper moving means 14 as described in FIG. 1 and as schematically indicated by the dash-dot line 24. A second drive roller 38 is rotatably mounted on the frame 21 and arranged to be engaged with the drive roller 36 by way of a clutch 39. Clutch 39 can be moved to effect engagement or disengagement between the first and second drive pulleys 36 and 38 as by means of a lever arm 40 pivoted at 41. Operation of this clutch means to disengage the drive rollers, as mentioned heretofore, can be effected in response to operation of the cut button 15 on the reader/printer of FIG. 1, again indicated in FIG. 3 by the dash-dot line 25.

Referring now to the upper portions of FIGS. 3 and 4 there is shown an idler roller 42 connected to the frame 21 and an endless drive belt 43 encircling the idler roller 42 and the second drive roller 38. This belt extends parallel and adjacent to the first guide rail 28 and includes a clamp means 44 connecting the left side of the carriage 22 to the belt. It will be evident, accordingly, that when the second drive pulley 38 is rotated in a direction indicated by the arrows, the belt 43 will be moved in a forward direction to move the clamp and thus the carriage 22 in the same direction. When the carriage reaches a position close to the idler roller 42, the clutch 39 is disengaged to stop the drive roller 38 and the carriage then manually retracted as by the handle 27. This retraction of the carriage also moves the belt in a reverse direction because of the clamp connection so that when the clutch is again actuated or engaged, the carriage will again move from the drive pulley 38 towards the idler roller 42.

Figure 5:
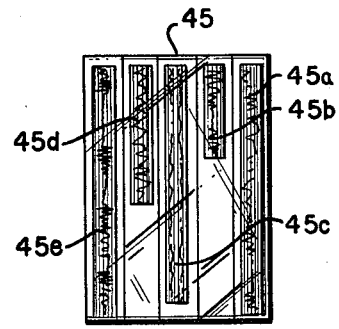
FIG. 5 is a plan view of a typical microfiche from which data is printed by means of the module and reader/printer; and, FIG. 6 is a fragmentary cross section of the module looking in the direction of the arrows 6—6 of FIG. 4.

As briefly mentioned heretofore, the platen 23 is dimensioned to support a microfiche indicated in FIG. 4 at 45 and shown in greater detail in FIG. 5. In the particular example set forth, and with particular reference to FIG. 5, the microfiche 45 includes a plurality of columns extending in parallel side-by-side relationship generally in the fore and aft direction of movement of the carriage 22 when positioned on the platen. These columns are designated 45a, 45b, 45c, 45d and 45e. Each of the columns includes data images depicting an oil well log, it being understood that the complete log is formed if the respective columns are connected end-to-end.

It will now be appreciated that in order to project the image information in each column by means of the light source and projection lens, it is necessary to effect movement of the microfiche in a direction at right angles to the fore and aft direction to enable proper positioning of successive columns. In FIG. 4, the position of the light source 12 is schematically indicated by the dashed circle, the same being positioned beneath the first column 45a of the microfiche. When the carriage 22 is completely retracted, the light source will pass light through the initial portion of the first column 45a and when the carriage 22 moves in the forward direction to the phantom line position 22' in FIG. 4, the light source 12 will be positioned at the end of the first column 45a. Movement of the film platen 23 to the right a distance of one column width is then effected as by means of the knob 26.

Figure 6:
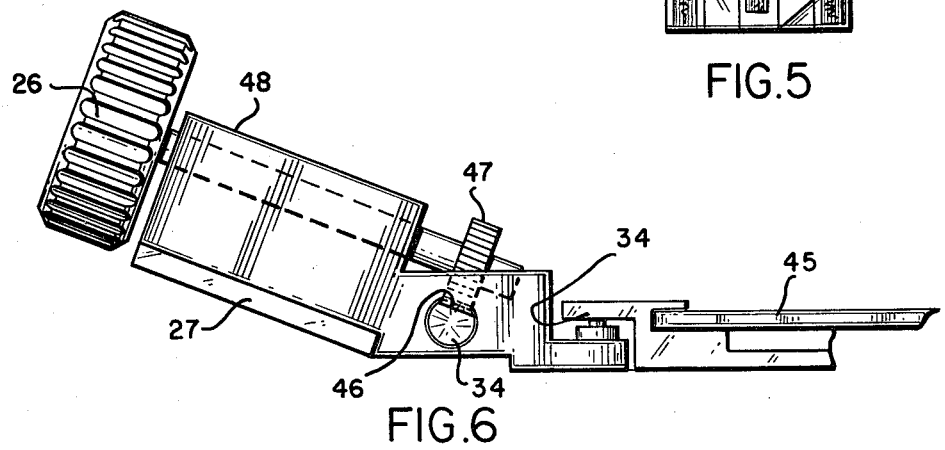

With respect to the foregoing, and with particular reference to FIG. 6, the transverse guide rail 34 is provided with gear teeth 46 arranged to mesh with a gear pinion 47 rotatable by the knob 26. The knob 26 itself is journalled in an appropriate support 48 secured to the platen 23. It will be appreciated that fine incremental movements of the platen 23 in a right or left hand direction can be effected by manual rotation of the knob.

OPERATION

The operation of the microfiche scanner module will be evident from the foregoing description. Thus, with the frame 21 of the module properly positioned within the opening 19 as described in FIG. 1, the carriage 22 may be retracted by the handle 27 and a microfiche such as microfiche 45 positioned on the film platen 23. The initial data imaging in the first column 45a of the microfiche between the light source 12 and projection lens 13 is accomplished by simply manually moving the carriage back and forth by the handle 27 and moving the platen in a left and right direction by the knob 26 while observing the projected image on the display screen 16. In this respect, the clutch 39 is disengaged from the first drive roller 36. With the microfiche properly positioned, the clutch 39 is engaged and the reader/printer started so that the print paper moving means will drive the endless belt 43 through the clutch 39 moving the carriage in a forward direction. The rate or speed of movement is proportional to the speed the paper is moved in the upper housing so that the projected image from the column will have a speed equal to the speed of the paper at the surface of the paper. In other words, a proper printing will take place without any blurring.

When the carriage 22 has moved to the phantom line position 22' illustrated in FIG. 4, so that the entire first column 45a is scanned, the paper cut button 15 on the lower housing 11 is depressed by the operator and this action also disengages automatically the clutch 39. The carriage is then manually retracted and the knob 26 rotated to adjust the position of the microfiche so that the light source 12 falls under the initial portion of the second column 45b. The clutch is then again engaged and the carriage moved forwardly by the print paper moving means.

The initial cut print paper is developed in the printer and passes out through the upper portion as indicated at 17 in FIG. 1. There is provided a continuous log in printed form for each column of the microfiche and these cut papers each containing the log of a column can then be readily pieced together to form a continuous log of all of the information on the microfiche.

From all of the foregoing, it will be evident that the present invention has provided an appropriate mechanism enabling conventional reader/printer projectors normally provided for microfilm to be used with microfiche without any major alterations of the reader/printer itself.

Various changes falling clearly within the scope and spirit of this invention will occur to those skilled in the art. The microfiche scanner module is therefore not to be thought of as limited to the exact details set forth merely for illustrative purposes.

I claim:

1. A microfiche scanner module for insertion in a microfilm reader/printer projector including a light source, projection lens, print paper moving means, paper cut button and display screen, as a substitute for the normal microfilm cartridge mechanism for said projector, said module comprising:
   (a) a supporting frame positionable in said reader/printer projector between said light source and projection lens in the opening normally occupied by said microfilm cartridge mechanism;
   (b) a carriage mounted on said supporting frame for movement in a fore and aft direction;
   (c) a film platen mounted on said carriage for movement in a left and right direction, said film platen being dimensioned to hold a microfiche having a plurality of side-by-side columns of images to be printed extending in said fore and aft directions;
   (d) means connected to said print paper moving means to move said carriage in a forward direction at a rate proportional to the speed of movement of said print paper so that the image in a first column is projected onto said print paper for printing as said column is moved between said light source and projection lens;
   (e) means responsive to said paper cut button for disconnecting said print paper moving means from said carriage so that said carriage can be retracted to its initial position; and,
   (f) means for moving said film platen to the right to position the initial portion of the next adjacent column between said light source and lens, whereby said carriage can again be moved in a forward direction by reconnecting it to said print paper moving means at a rate proportional to the speed of movement of said print paper so that said next column image is printed, the process being repeated to thereby provide a continuous series of paper print read-outs of the information in the column images respectively the same as though the column images were provided successively on microfilm.

2. A scanner module according to claim 1, in which said supporting frame includes first and second spaced parallel guide rails extending in said fore and aft direction, said carriage having upwardly extending guide blocks on its left and right sides through which said rails pass so that said rails guide movement of said carriage in said fore and aft direction, said carriage including transverse guide rails extending in said left and right direction, said film platen riding on said transverse guide rails for movement in said left and right direction, said means responsive to said print paper moving means including a first drive roller on said frame connected for continuous rotation to said print paper moving means; a second drive roller on said frame; clutch means on said frame connecting said first drive roller to said second drive roller when actuated and disconnecting said first drive roller from said second drive roller when de-actuated; an idler roller on said frame spaced in a forward direction from said second drive roller; an endless belt passing over said idler roller and second drive roller, said belt extending parallel and adjacent to said first rail; clamp means securing a side of said carriage to said belt so that rotation of said second drive roller moves said belt to thereby move said carriage in said forward direction; said means responsive to operation of said paper cut button being connected to said clutch means for de-actuating said clutch means when said paper cut button is operated.

3. A scanner module according to claim 2, in which said means for moving said film platen to the right includes gear teeth provided on one of said transverse guide rails; and a manually rotatable gear pinion mounted on said platen in meshing relationship with said gear teeth so that rotation of said gear pinion moves said platen in a controlled manner, proper positioning of a successive column being effected by observing said display screen while rotating said pinion.

* * * * *